UNITED STATES PATENT OFFICE.

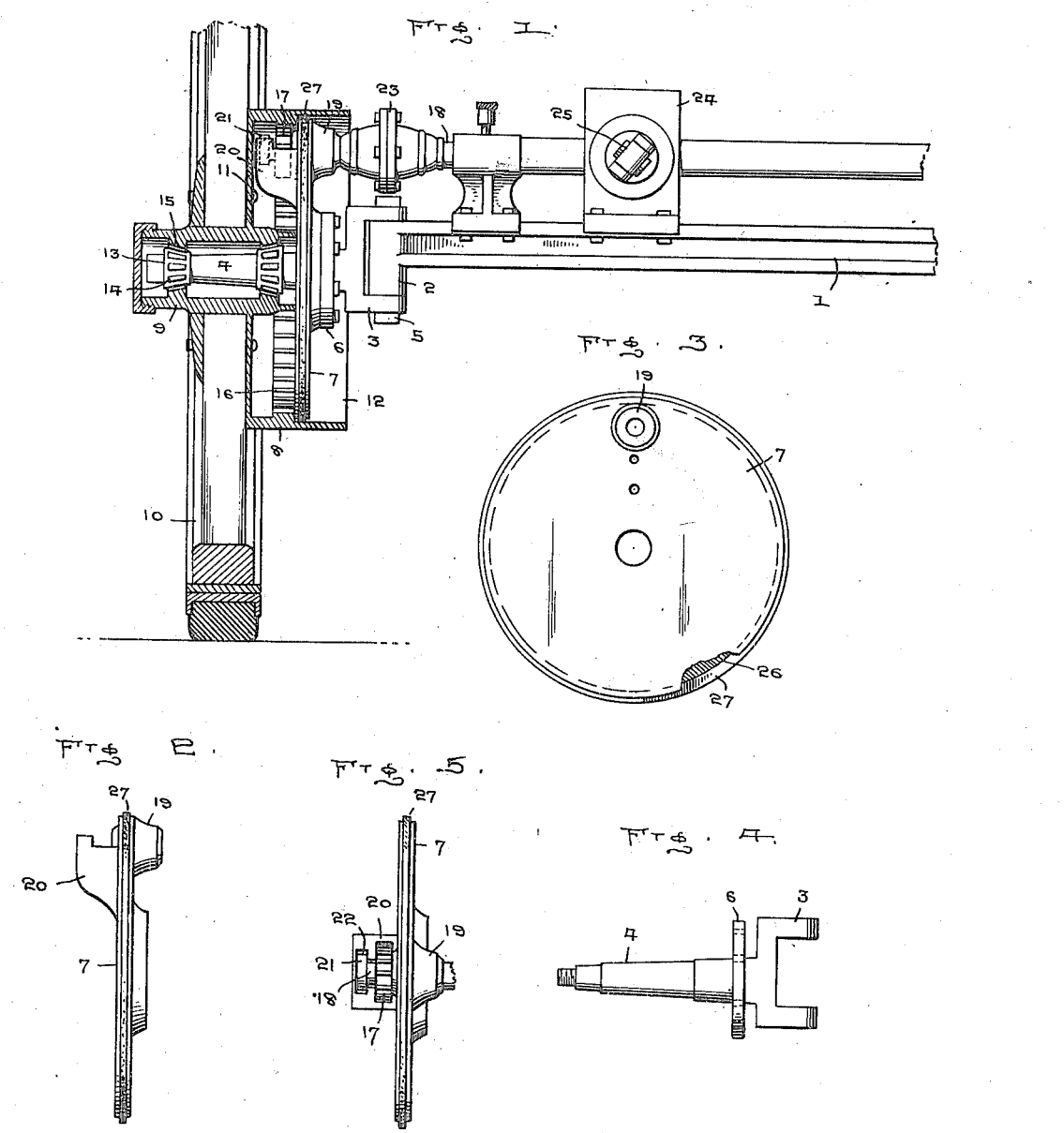

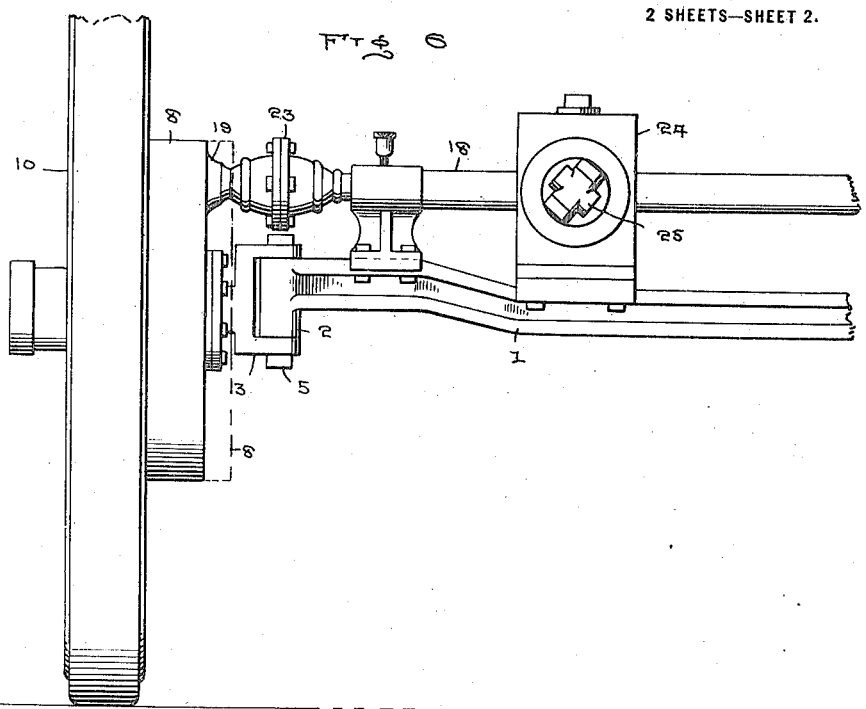
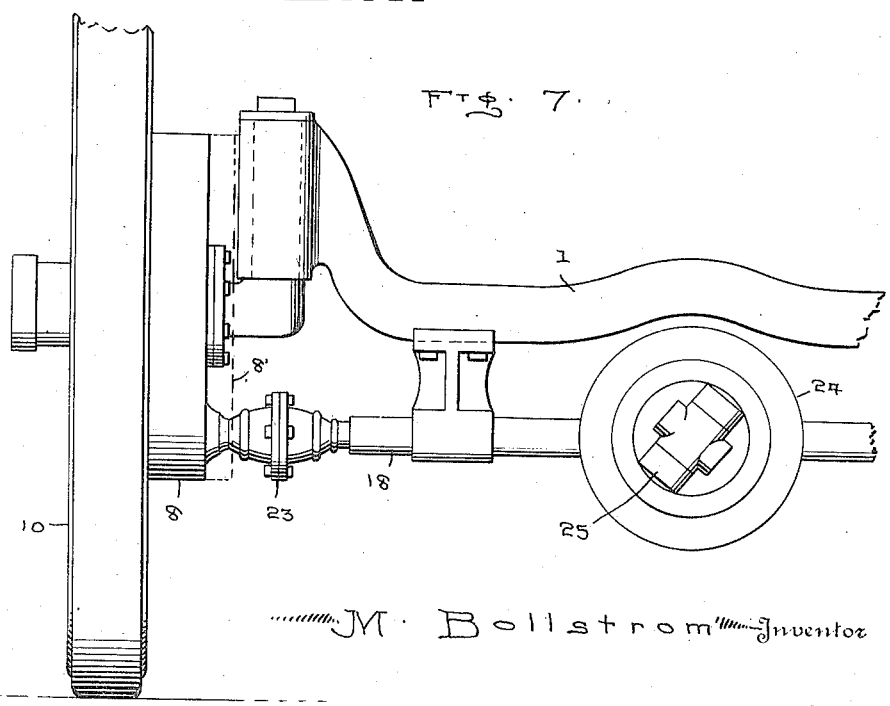

MAURICE BOLLSTROM, OF BATTLE CREEK, MICHIGAN.

DRIVING MECHANISM FOR POWER-PROPELLED VEHICLES.

1,184,814.  Specification of Letters Patent.  Patented May 30, 1916.

Application filed July 9, 1915. Serial No. 38,964.

*To all whom it may concern:*

Be it known that I, MAURICE BOLLSTROM, a citizen of the United States, residing at Battle Creek, in the county of Calhoun and State of Michigan, have invented certain new and useful Improvements in Driving Mechanism for Power-Propelled Vehicles; and I do hereby declare the following to be a full, clear, and exact description of the invention, such as will enable others skilled in the art to which it appertains to make and use the same.

My invention relates to new and useful improvements in driving mechanism for power propelled vehicles or any other use to which the same may be applied, and my object is to provide means for applying power to the front or steering wheels of the vehicle.

A further object is to provide a packing means for parts of the construction whereby dust, grit, etc., will be excluded therefrom and oil retained therein. And a further object is to provide supports for certain of the driving shafts.

Other objects and advantages will be hereinafter set forth and more particularly pointed out in the accompanying specification.

In the accompanying drawings which are made a part of this application, Figure 1 is a detail sectional view of the front axle of the vehicle showing the wheel and driving mechanism therefor. Fig. 2 is an edge elevation of a disk for the inner end of the hub of the wheel. Fig. 3 is an elevation thereof with a portion broken away. Fig. 4 is an elevation of the wheel supporting spindle. Fig. 5 is an edge elevation of the disk, showing in top plan the shaft supporting bracket with the end of the driving shaft and gear carried thereby in position. Fig. 6 is an elevation of a drop form of axle showing my device attached thereto, and Fig. 7 is an elevation showing the manner of attaching the driving mechanism below the axle.

Referring to the drawings in which similar reference numerals designate corresponding parts throughout the several views, 1 indicates an axle which may be constructed in any preferred manner and of that class ordinarily used in connection with power propelled vehicles, each end of the axle having a hollow knuckle 2—2 integral therewith with which coöperates a yoke 3 of the spindle 4, said yoke and knuckle being secured together by means of a bolt 5, or the like, as is usual in constructions of this kind.

The spindle 4 is provided adjacent its inner end with a flange 6 which is preferably integral with the spindle, to which is attached a disk 7, said disk forming a closure for the open end of a drum 8, the flange 11 of which is formed integral with the hub 9 of the wheel 10.

The spindle 4 is provided with the usual cones 13 which carry bearing rollers 14, said bearing rollers engaging races 15 on the interior of the hub. The interior of the drum 8 is provided with a driving gear 16 with which coöperates a pinion 17 carried by one section of a driving shaft 18, said driving shaft extending through a bushing 19 on the disk 7 and having its inner end engaged with a supporting bracket 20, preferably formed integral with the inner face of the disk 7.

The inner end of the shaft 18 is entered into an annular bearing 21 which is seated in a recess 22 formed in the upper end of the bracket 20, thus permitting the shaft to freely rotate without undue friction and at the same time retaining the same in proper alinement. The recess is of sufficient depth to practically incase the bearing 21 and the pinion 17 is also partially incased by the bracket so that oil will be retained in the recesses in the end of the bracket to properly lubricate the pinion and the annular bearing. The shaft 18 is provided in its length with a universal joint 23 which is positioned directly over the knuckle joint 2 so that that portion of the shaft carrying the pinion 17, may readily swing with the guide wheel and at the same time impart rotating motion to the pinion. Power is applied to the shaft 18 in any suitable manner preferably through the medium of a compensating gear 24, said compensating gear having a knuckle joint 25 to which the usual form of driving shaft (not shown) is attached.

In order to provide a perfect seal between the disk 7 and the interior wall of the drum 8 the peripheral edge of the disk is provided with a channel 26 in which is disposed a packing ring 27, said ring being preferably composed of felt or similar substance and is designed to press against the interior wall of the drum to form a perfect seal, thereby excluding dirt, grit, etc., from the interior of the hub and at the same time retaining the grease and oil within the hub.

It will thus be seen that I have provided a very cheap and durable form of driving mechanism for the front or guiding wheels of vehicles and by providing the packing around the edge of the disk, the bearing points within the hub will be thoroughly protected from dirt, grit, etc., and that the oil will be prevented from leaving the hub.

By extending the drum beyond the interior gear 16 a sufficient distance as shown at 12, either an exterior or interior brake mechanism may be used.

In Fig. 6 of the drawings the driving mechanism is shown attached to the usual form of drop axle, while in Fig. 7 of the drawings, the driving mechanism is shown as suspended below the axle as when used in connection with the usual form of touring car, it being readily understood that the driving mechanism can be positioned above or below the axle as occasion may require. In these two figures the drums 8 are constructed to receive external brakes only but by increasing the depth of the drum, as indicated by dotted lines 8', an interior brake may be used. It will also be understood that the structure is not changed in any manner to adapt the same for use above or below the axle as it is but necessary to rotate the disk until the driving shaft and parts coöperating therewith are positioned below the spindle instead of above the same.

Having thus fully described my invention what I claim as new and desire to secure by Letters Patent of the United States is:

1. A driving mechanism for the front wheels of a vehicle comprising the combination with an axle, a spindle pivotally attached thereto and a wheel carried by the spindle, of a driving shaft, a drum carried by the hub of said wheel, a driving gear interiorly of said drum, a pinion fixed to the shaft and meshing with said driving gear, an annular bearing fixed to the end of said shaft, and a supporting bracket having a recess for the reception of said pinion and annular bearing, said recesses partly inclosing the faces and edges of the pinion and bearing.

2. A driving mechanism for the front wheels of a vehicle, comprising the combination with a spindle and a wheel rotatably mounted on said spindle, of a driving shaft, an annular bearing at the end of the shaft, a drum carried by the wheel, a gear interiorly of the drum, a pinion carried by the driving shaft and meshing with said driving gear, a disk carried by said spindle forming a seal for the open end of said drum, and a supporting bracket carried by said disk, having recesses in its free end for the reception of said pinion and annular bearing.

3. A driving mechanism for vehicles comprising a spindle having a flange thereon, a hub mounted on said spindle, a hollow drum fixed to the hub, a driving gear attached to the interior face of the drum, a driving shaft, a pinion on said driving shaft meshing with said driving gear, a disk attached to said flange, a packing ring carried by the disk adapted to engage the inner wall of the drum and form a seal, and a supporting bracket carried by the disk to form a bearing for the outer end of the driving shaft.

4. A driving mechanism for motor propelled vehicles, comprising a spindle having a flange thereon, a hub, a hollow drum integral with the hub, a gear in said drum, a driving shaft, a pinion on the driving shaft engaging said gear, a disk attached to said flange and entering the drum, said disk having a circumferential channel in its peripheral edge, and a packing ring seated in said channel to form a seal between the disk and drum.

In testimony whereof I have signed my name to this specification in the presence of two subscribing witnesses.

MAURICE BOLLSTROM.

Witnesses:
 ARTHUR W. PETERS,
 N. E. RETALLICK.